(12) United States Patent
Koorland et al.

(10) Patent No.: US 7,703,667 B2
(45) Date of Patent: Apr. 27, 2010

(54) MANAGEMENT AND APPLICATION OF ENTITLEMENTS

(75) Inventors: Neil K. Koorland, Issaquah, WA (US); Geeman Yip, Kirkland, WA (US); Herman J. Man, Issaquah, WA (US); Brian T. Kress, Redmond, WA (US); John H. Zybura, Seattle, WA (US); Jing Wu, Sammamish, WA (US); Matthias Leibmann, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1087 days.

(21) Appl. No.: 11/276,582

(22) Filed: Mar. 6, 2006

(65) Prior Publication Data

US 2007/0215683 A1    Sep. 20, 2007

(51) Int. Cl.
*G06F 17/00* (2006.01)
(52) U.S. Cl. ................................. 235/375; 705/1; 705/8
(58) Field of Classification Search ................. 235/375, 235/376; 705/1, 8, 10
See application file for complete search history.

(56) References Cited

U.S. PATENT DOCUMENTS

| 2002/0049627 A1* | 4/2002 | Goli et al. ..................... 705/10 |
|---|---|---|
| 2003/0009691 A1 | 1/2003 | Lyons et al. |
| 2003/0105654 A1* | 6/2003 | MacLeod et al. ................ 705/7 |
| 2004/0044895 A1 | 3/2004 | Reasons et al. |
| 2004/0064353 A1 | 4/2004 | Kim et al. |
| 2005/0060572 A1* | 3/2005 | Kung et al. .................. 713/201 |
| 2005/0283372 A1 | 12/2005 | Jorgenson et al. |
| 2006/0041436 A1 | 2/2006 | Brodie et al. |
| 2007/0124269 A1* | 5/2007 | Rutter et al. ................... 707/1 |
| 2008/0034055 A1* | 2/2008 | Das et al. ..................... 709/217 |

OTHER PUBLICATIONS

International Search Report for PCT/US2007/003125 mailed Jul. 5, 2007. 7 Pages.

* cited by examiner

*Primary Examiner*—Ahshik Kim

(57) ABSTRACT

A method and system for managing and applying entitlements is described herein. An identity integration server centrally manages data associated with entitlements for a plurality of identities. The integration server may select one of a plurality of workflows. One or more of a plurality of entitlements to be used in the workflow are selected, and a set of identities for which the workflow is applicable is selected. A determination is made as to whether the workflow should be run on the identities. If so, then the workflow is initiated. The one or more entitlements are then added to a granted entitlements list. Then, a separate process may be initiated to apply the one or more entitlements to the one or more identities.

16 Claims, 7 Drawing Sheets

MANAGEMENT AND APPLICATION OF ENTITLEMENTS

BACKGROUND

Entitlements describe a capability that can be enabled or disabled for a given identity on a given application or system. Entitlements are usually granted to identities based on a business process. For example, each full-time employee may be given an email account if a manager approves. In this example, if the employee has full-time status, an e-mail notification would be sent to the manager for approval. Once the manager approval is received, an email account may be created for the employee.

In a typical provisioning application, entitlements are applied inline with the business process. If entitlements are applied directly to an application, it would require the executor of the business process to have permissions to the application in which the entitlement is being applied to. In addition, it may be costly to enable the entitlements on the application depending on factors such as network traffic and system load. Different business processes may also be applying the same entitlement. In this case, the system may end up with redundant calls to the application. Furthermore, the system may apply the entitlement onto the application in an inconsistent manner.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various technologies and techniques directed to methods and systems for managing and applying entitlements. In accordance with one implementation of the described technologies, an identity integration server centrally manages data associated with entitlements for a plurality of identities. The integration server may select one of a plurality of workflows. One or more of a plurality of entitlements to be used in the workflow are selected, and a set of identities for which the workflow is applicable is selected. A determination is made as to whether the workflow should be run on the identities. If so, then the workflow is initiated. The one or more entitlements are then added to a granted entitlements list. Then, a separate process may be initiated to apply the one or more entitlements to the one or more identities.

In another implementation of the described technologies, the integration server receives a request to grant an entitlement to an identity. The integration server determines whether the entitlement already exists. If so, then nothing has to be done. If not, then the entitlement may be granted. Another process may be initiated to apply the entitlement to the identity.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
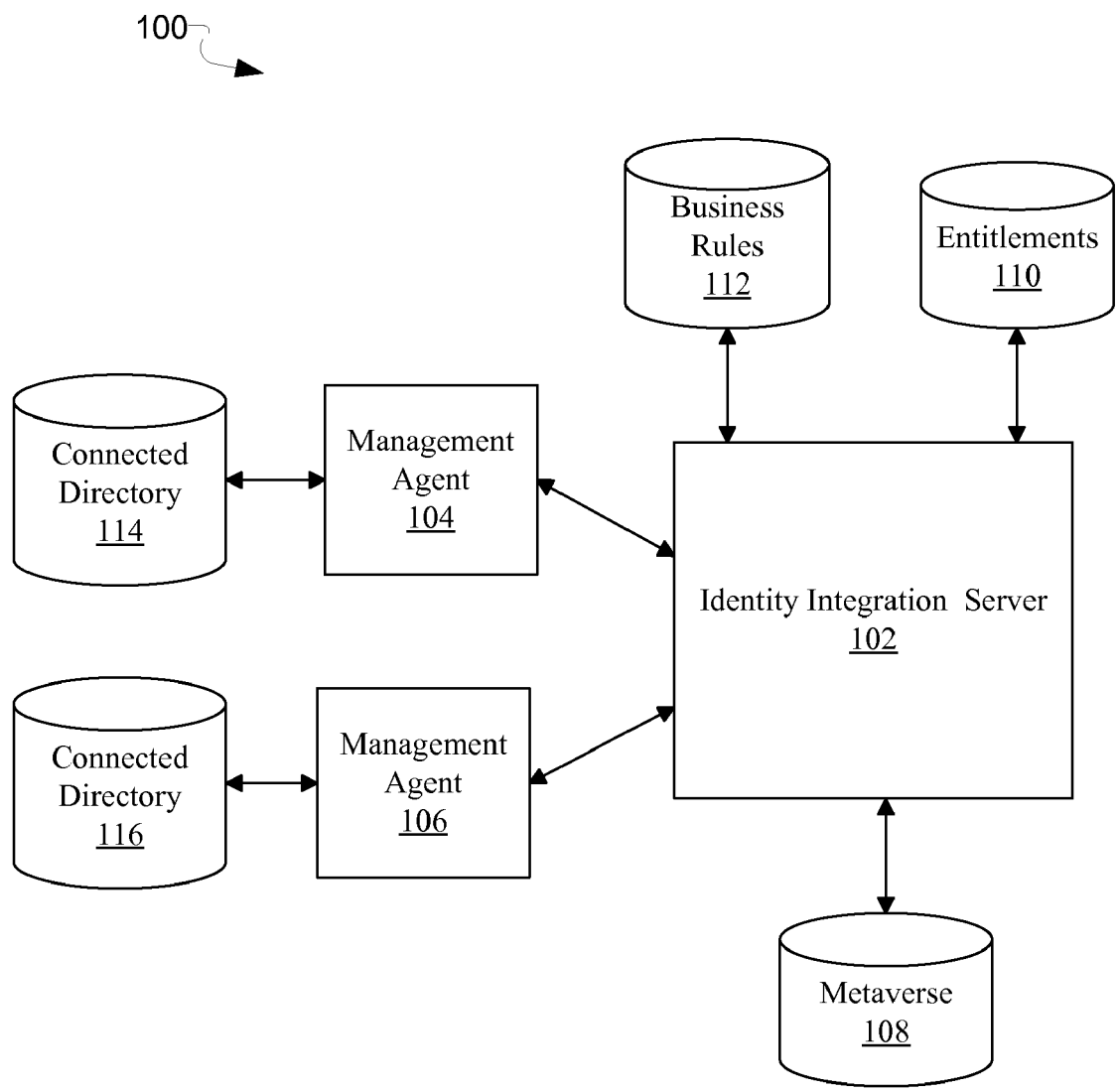
FIG. 1 is a block diagram illustrating an exemplary system for managing and applying entitlements.

FIG. 1 is a block diagram illustrating an exemplary system 100 for managing and applying entitlements. Entitlements describe a capability that can be enabled or disabled for a given user and application. Examples of entitlements include but are not limited to an account, such as a user account, an email account, or a mailbox, or an access right, such as remote system access or access to a shared site. Entitlements may be granted or revoked based on a business process or workflow. For example, an email account may be granted to an employee after the employee's manager approves the account.

In system 100, the business processes are decoupled from the application of the entitlements. Entitlements are defined globally within system 100. Each entitlement has a unique identifier (ID). The entitlement ID corresponds to an entitlement definition that describes how the entitlement is enabled or disabled for an application. The entitlement ID and definitions may be stored in a data store 110. The business rules that define the business processes or workflows for approving the grant of an entitlement or for revoking an entitlement may be stored in a data store 112.

System 100 includes an identity integration server 102 to centrally manage the application of entitlements. One or more directories, such as 114 or 116, are coupled to the identity integration server 102 via a corresponding management agent, such as 104 or 106. The identity integration server 102 maintains a data store 108 that stores metaverse objects. Each metaverse object may have data that is associated with an identity managed by system 100. For example, a company may maintain metaverse objects that are associated with its employees. Other examples of identities include but are not limited to users, groups, organizational roles, applications, or systems.

Each metaverse object may have a granted entitlements list (GEL) and a current entitlements list (CEL). The granted entitlements list is a list of the entitlements that the metaverse object should have according to the business rules. An entry on the granted entitlements list may include but is not limited to a reference to the definition of the entitlement, a reference to the process that created the entry, and/or an operation to be done, such as adding or removing the entitlement. The current entitlements list is a list of the entitlements that the metaverse object currently has based on the entitlement definitions configured in the identity integration server.

When an entitlement is to be added or removed for an identity managed by the system 100, a request to add or remove the entitlement may be sent to the identity integration server 102. The business process or workflow that is associated with granting or revoking the entitlement is determined and initiated. When the business process or workflow is completed, a reference of the entitlement may be set on the granted entitlements list of the metaverse object associated with the identity. Once the business process or workflow is completed, a separate process may be initiated to apply the entitlement through the management agent connector space to the appropriate connected directory. Since the application of the entitlements is decoupled from the business processes, the business processes do not have to know how entitlements are defined and applied. The system may batch up entitlement requests. Furthermore, the evaluation of business processes and the application of entitlement references may be performed in parallel.

Figure 2:
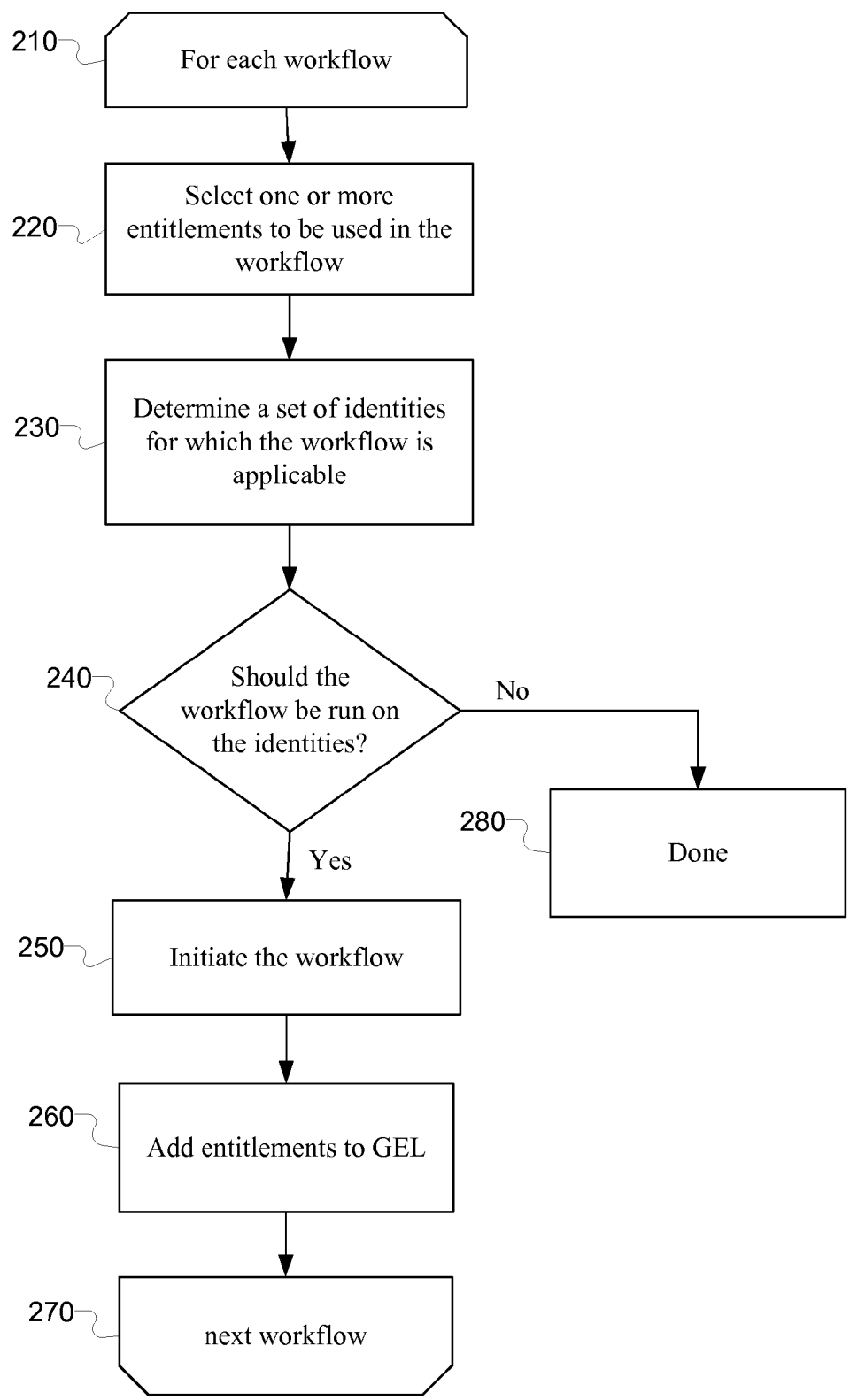
FIG. 2 is a flow diagram illustrating an exemplary process for selecting and applying entitlements to selected identities.
Figure 3:
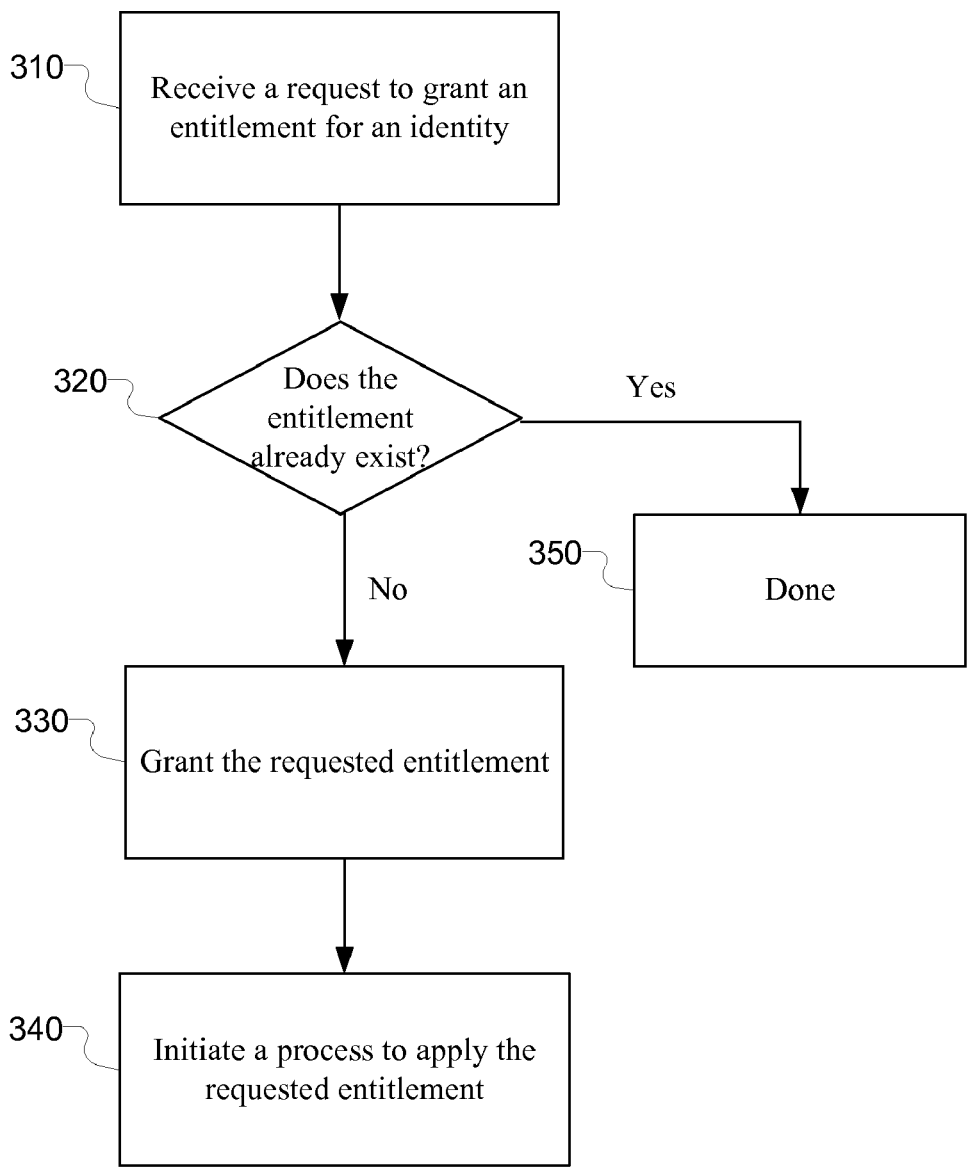
FIG. 3 is a flow diagram illustrating an exemplary process for applying an entitlement to an identity upon request.

FIGS. 2-3 are flow diagrams illustrating exemplary processes for applying entitlements. While the description of FIGS. 2-3 may be made with reference to other figures, it should be understood that the exemplary processes illustrated in FIGS. 2-3 are not intended to be limited to being associated with the systems or other contents of any specific figure or figures. Additionally, it should be understood that while the exemplary processes of FIGS. 2-3 indicate a particular order of operation execution, in one or more alternative implementations, the operations may be ordered differently. Furthermore, some of the steps and data illustrated in the exemplary processes of FIGS. 2-3 may not be necessary and may be omitted in some implementations. Finally, while the exemplary processes of FIGS. 2-3 contains multiple discrete steps, it should be recognized that in some environments some of these operations may be combined and executed at the same time.

FIG. 2 is a flow diagram illustrating an exemplary process for selecting and applying entitlements to selected identities. At 210, a workflow is selected. At 220, one or more of a plurality of entitlements to be used in the workflow are selected. At 230, a set of identities for which the workflow is applicable is selected. At 240, a determination is made as to whether the workflow should be run on the identities. If not, then at 280, the process may be complete. If so, then at 250, the workflow is initiated. At 260, the one or more entitlements are added to the GEL of the identities on which the workflow is run. If there is an approval process for the workflow, then this process is initiated before the application of the entitlements. Then, at 270, the next workflow is selected and the process is repeated from step 220.

FIG. 3 is a flow diagram illustrating an exemplary process for applying entitlements upon request. At 3 10, a request is received to grant an entitlement for an identity. The identity may be associated with a stored metaverse object. At 320, a determination is made as to whether the requested entitlement already exists. If the requested entitlement already exists, then at 350, the process may be complete. If the requested entitlement does not exist, then at 330, the requested entitlement is granted. Then, at 340, a process may be initiated to apply the requested entitlement to the identity.

A similar process may be performed for a request to revoke an entitlement. If the entitlement does not exist, then nothing has to be done. If the entitlement does exist, then the entitlement is revoked.

Figure 4:
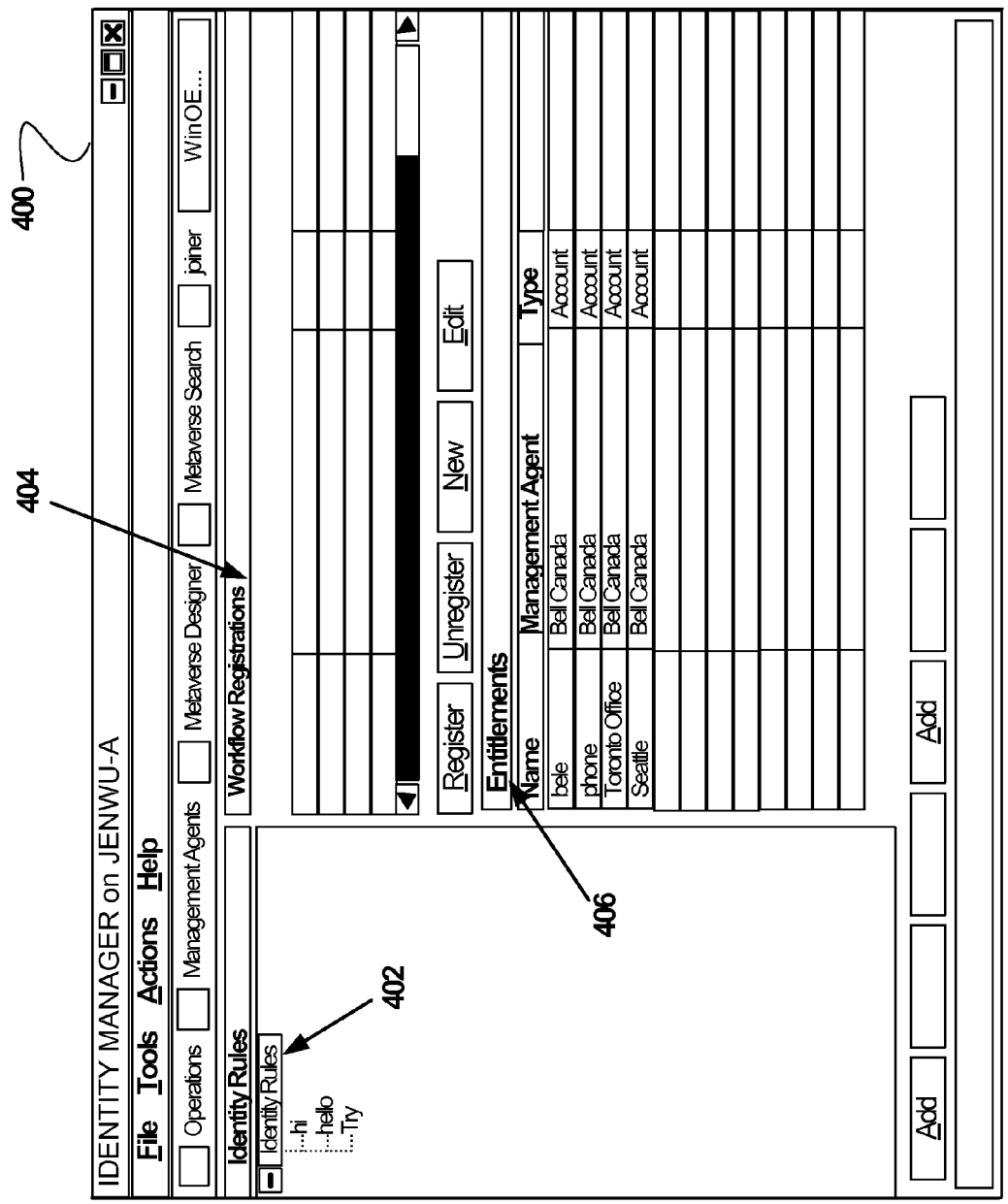
FIG. 4 is a screenshot illustrating an exemplary user interface for managing entitlements.

FIG. 4 is a screenshot illustrating an exemplary user interface 400 for managing entitlements. The interface includes identification and management of identity rules, as shown at 402, workflows such as shown at 404, and entitlements such as shown at 406. The identity rules define the criteria for identifying the one or more of a plurality of identities that are selected for the application of one or more entitlements managed by the identity integration server. For example, an identity rule may specify criteria such as full-time employee, employee in the engineering department, and/or employee working in Building 8.

Each identity rule may have a precedence associated with it. For example, working in the engineering department may have a higher precedence than being a full-time employee. The precedence indicator may be used to resolve conflicts between entitlements approved for groups of identities according to the identity rules. For example, suppose that being a full-time employee entitles you to an email account, but no remote system access. Suppose that being in the engineering department entitles you to remote system access. If an employee is full-time and in the engineering department, then after the corresponding workflows are executed, the employee may have a granted entitlement list that contains entitlements from being a full-time employee (such as an email account and no remote system access) and entitlements from being in the engineering department (such as remote system access). Since being in the engineering department has a higher precedence than being a full-time employee, then the employee is given an email account and remote system access. Suppose that the same employee then transfers to the human resources department and suppose that being in the human resources department does not have any additional entitlements associated with it. Then, the employee would only have an email account and would no longer have remote system access. In this way, an administrative may set up a standard set of entitlements for base identity rules and grant more specific entitlements to specific identity rules.

The workflow definitions define a business process to follow to grant one or more entitlements for a selected identity. For example, the workflow may include sending an email to a manager or calling an administrator. Alternatively, the business rules for a company may be such that an identity rule is sufficient and so therefore, no additional approval is needed within a workflow. For example, all full-time employees may be given an email account. Therefore, if an employee's status is full-time, then the workflow would grant an email account to the employee.

The entitlement definitions describe how entitlements are enabled or disabled for applications. A entitlement definition includes an assertion and flow rules. The assertion is criteria that is used by the identity integration server to identify an entitlement. The assertion is used to match object entitlements. The assertion may be used to determine whether an object already exists in the connector space. If it does not, then an object may be created in the connector space. For attribute entitlements, the assertion is used to determine whether the attribute already exists and to populate the current entitlement list. The flow rules are used to populate attributes for the entitlement. An object entitlement may have initialize and persistent flow rules, while an attribute entitlement may just have persistent flow rules. Furthermore, an attribute entitlement may have a dependent object, which has an ID of an object entitlement to which the attribute entitlement depends. For example, an Active Directory (AD) entitlement, which is an object entitlement, may have an assertion of PrimaryObjectClass="user", an initialize flow rule of Password="foobar", and persistent flow rules of {DisplayName}=Metaverse.DisplayName, PrimaryObjectClass="user", and Dn={DisplayName}+ou=Users, dc=Redmond, dc=Microsoft, dc=com. A Remote Access System (RAS) entitlement, which is attribute entitlement, may have a dependent object of the ID of the AD user entitlement, an assertion of RAS="true", and a persistent flow rule of RAS ="true".

Figure 5:
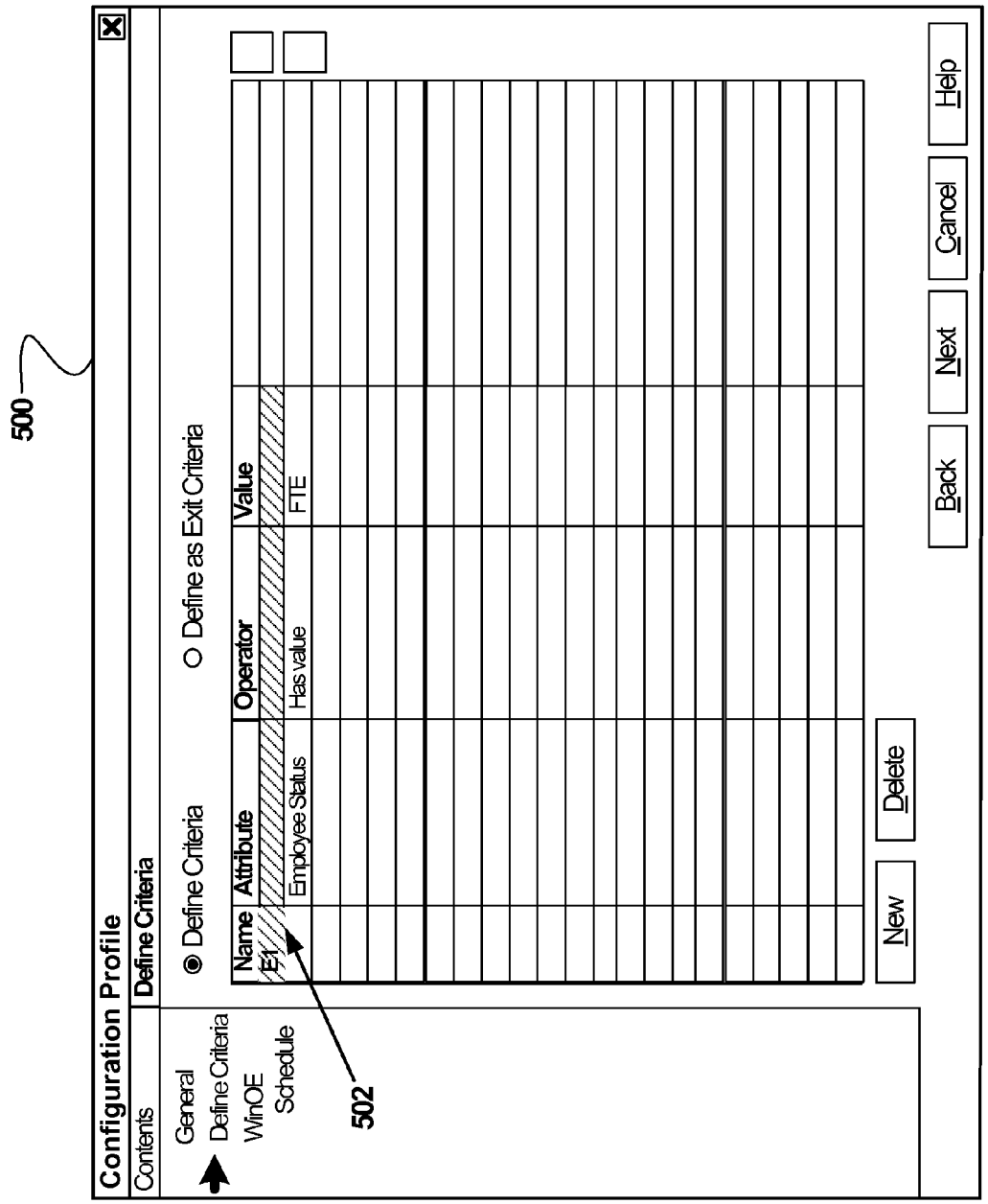
FIG. 5 is a screenshot illustrating an exemplary user interface for defining an identity rule.

FIG. 5 is a screenshot illustrating an exemplary user interface 500 for defining an identity rule. The identity rules define the criteria for identifying the one or more of a plurality of identities that are selected for the application of one or more entitlements managed by the identity integration server. In this example, the identity rule 502 defines a group of identities that have an attribute of employee status equal to Full-Time Employee (FTE). Therefore, the group of identities that this identity rule refers to are the full-time employees of the company.

Figure 6:
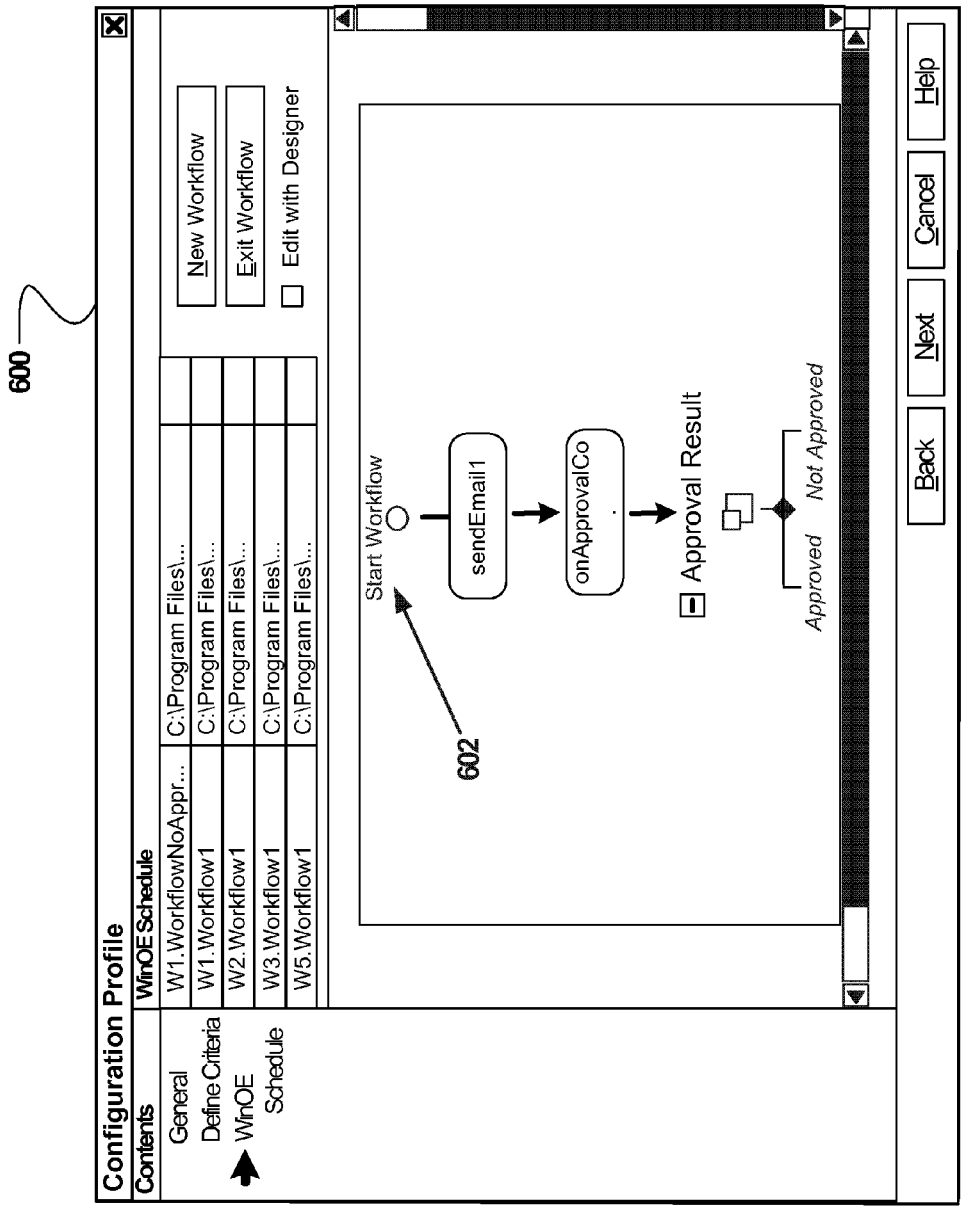
FIG. 6 is a screenshot illustrating an exemplary user interface for defining a workflow.

FIG. 6 is a screenshot illustrating an exemplary user interface 600 for defining a workflow. The workflow definitions define a business process to follow to grant or revoke a selected entitlement for a selected identity. In this example, the workflow 602 defines steps in a business process that includes sending an email to a manager. After the steps in this example business process have been taken, the entitlement is either approved or not approved. If the entitlement is approved for the identity, then a separate process may be initiated to apply the entitlement to the identity.

Figure 7:
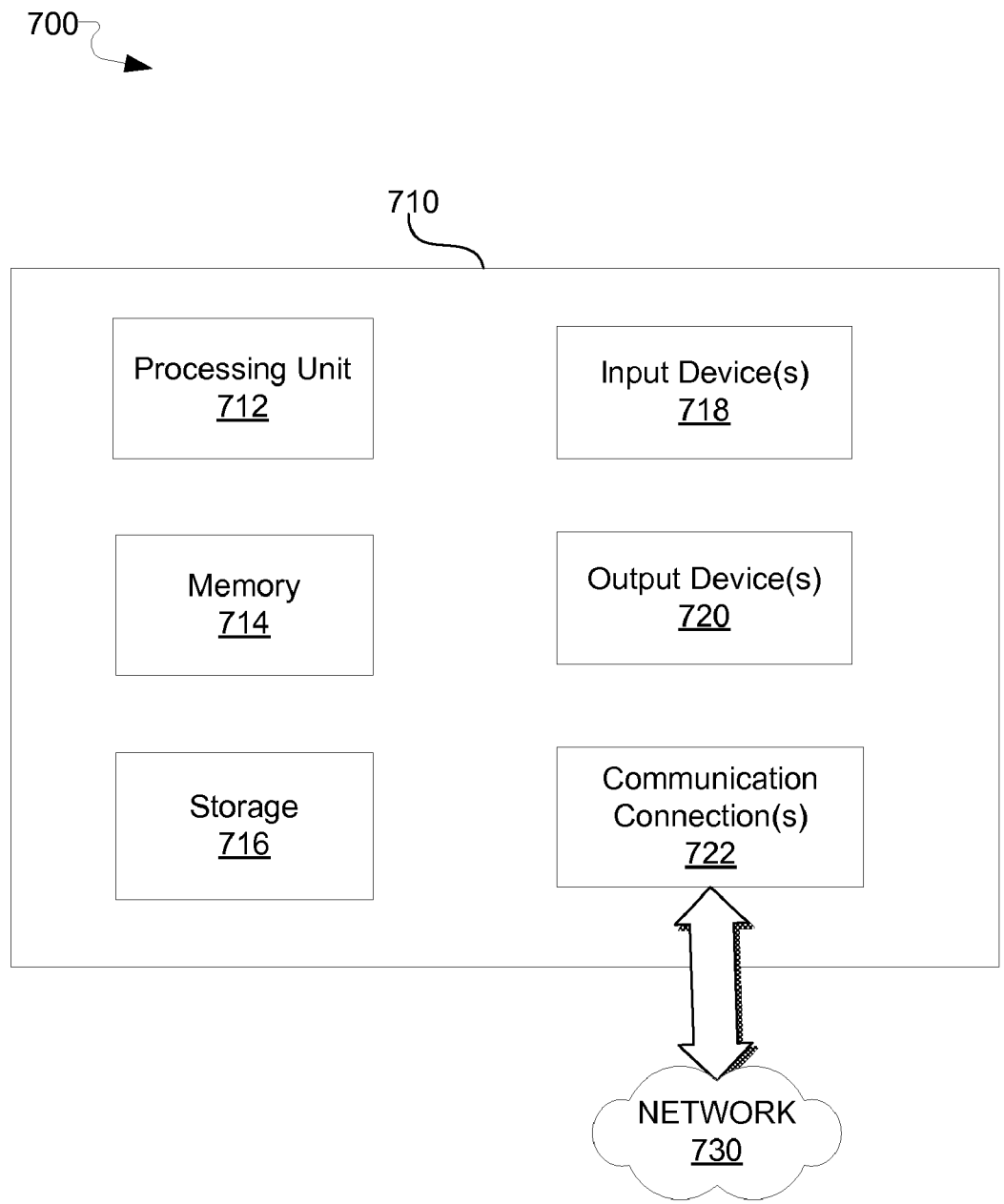
FIG. 7 illustrates an exemplary computing environment in which certain aspects of the invention may be implemented.

FIG. 7 illustrates an exemplary computing environment in which certain aspects of the invention may be implemented. It should be understood that computing environment 700 is only one example of a suitable computing environment in which the various technologies described herein may be employed and is not intended to suggest any limitation as to the scope of use or functionality of the technologies described herein. Neither should the computing environment 700 be interpreted as necessarily requiring all of the components illustrated therein.

The technologies described herein may be operational with numerous other general purpose or special purpose computing environments or configurations. Examples of well known computing environments and/or configurations that may be suitable for use with the technologies described herein include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

With reference to FIG. 7, computing environment 700 includes a general purpose computing device 710. Components of computing device 710 may include, but are not limited to, a processing unit 712, a memory 714, a storage device 716, input device(s) 718, output device(s) 720, and communications connection(s) 722.

Processing unit 712 may include one or more general or special purpose processors, ASICs, or programmable logic chips. Depending on the configuration and type of computing device, memory 714 may be volatile (such as RAM), non-volatile (such as ROM, flash memory, etc.) or some combination of the two. Computing device 710 may also include additional storage (removable and/or non-removable) including, but not limited to, magnetic or optical disks or tape. Such additional storage is illustrated in FIG. 7 by storage 716. Computer storage media includes volatile and nonvolatile, removable and non-removable media implemented in any method or technology for storage of information such as computer readable instructions, data structures, program modules or other data. Memory 714 and storage 716 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 710. Any such computer storage media may be part of computing device 710.

Computing device 710 may also contain communication connection(s) 722 that allow the computing device 710 to communicate with other devices, such as with other computing devices through network 730. Communications connection(s) 722 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes storage media.

Computing device 710 may also have input device(s) 718 such as a keyboard, a mouse, a pen, a voice input device, a touch input device, and/or any other input device. Output device(s) 720 such as one or more displays, speakers, printers, and/or any other output device may also be included.

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. A method comprising:
selecting an entitlement to be used in a workflow;
selecting identities for which the workflow is applicable;
determining that at least one of the identities does not have the entitlement;
based on the determining, initiating the workflow on the at least one identity to grant the entitlement to the at least one identity; and
initiating a process to apply the entitlement to the at least one identity.

2. The method of claim 1, wherein individual identities are associated with a stored metaverse object.

3. The method of claim 1, further comprising determining whether the at least one identity or at least one other of the identities has a selected entitlement that should be revoked.

4. The method of claim 3, further comprising initiating the workflow or another workflow to revoke the selected entitlement.

5. The method of claim 1, wherein the entitlement is an account.

6. The method of claim 1, wherein the entitlement is an access right.

7. A system comprising:
a data store to store metaverse objects, each metaverse object associated with an identity;

one or more management agents coupled to one or more directories to send requests for entitlements and to apply entitlements to corresponding directories; and an integration server coupled to the data store and to the one or more management agents to centrally manage data associated with individual entitlements for a plurality of identities, the integration server to receive the requests for entitlements from the one or more management agents, to initiate corresponding workflows for the requests, and to initiate processes to apply the individual entitlements to corresponding directories through corresponding management agents of the one or more management agents.

8. The system of claim 7, the integration server to maintain for each metaverse object a granted entitlements list indicating one or more entitlements that have been granted to the metaverse object via the corresponding workflows.

9. The system of claim 7, the integration server to maintain for each metaverse object a current entitlements list indicating one or more entitlements the metaverse object currently has.

10. The system of claim 7, further comprising a data store coupled to the integration server to store workflows, individual workflows associated with a business process to grant or revoke at least one of the entitlements for at least one of the plurality of identities.

11. The system of claim 7, further comprising a data store coupled to the integration server to store definitions for the entitlements.

12. One or more device-readable media with device-executable instructions for performing steps comprising:

receiving a request to grant an entitlement to an identity, the identity associated with a metaverse object;

determining a business process associated with granting the requested entitlement to the identity;

initiating the business process to grant the requested entitlement to the identity;

initiating a separate process to apply the requested entitlement to the identity; and adding the requested entitlement to a list of granted entitlements associated with the identity.

13. The one or more device-readable media of claim 12, wherein initiating a separate process to apply the requested entitlement to the identity comprises sending a request to a management agent to apply the requested entitlement to the identity.

14. The one or more device-readable media of claim 13, wherein the steps further comprise adding the requested entitlement to a list of current entitlements associated with the identity when the requested entitlement has been applied to the identity.

15. The one or more device-readable media of claim 12, wherein the requested entitlement is an account.

16. The one or more device-readable media of claim 12, wherein the requested entitlement is an access right.

* * * * *